(12) United States Patent
Kawabata et al.

(10) Patent No.: US 8,322,975 B2
(45) Date of Patent: Dec. 4, 2012

(54) VIBRATION CONTROL APPARATUS OF WIND TURBINE GENERATOR AND WIND TURBINE GENERATOR

(75) Inventors: Minoru Kawabata, Tokyo (JP); Atsushi Kubo, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/047,876

(22) Filed: Mar. 15, 2011

(65) Prior Publication Data

US 2012/0063915 A1    Mar. 15, 2012

Related U.S. Application Data

(63) Continuation of application No. PCT/JP2010/073514, filed on Dec. 27, 2010.

(51) Int. Cl.
*F03D 11/00* (2006.01)
(52) U.S. Cl. .......................... 415/119; 415/126; 416/500
(58) Field of Classification Search .................... 415/4.3, 415/4.5, 119, 126; 52/64, 69, 72, 167.2; 416/500
See application file for complete search history.

(56) References Cited

U.S. PATENT DOCUMENTS

| | | | |
|---|---|---|---|
| 3,789,174 A * | 1/1974 | Barkan et al. | 200/294 |
| 4,320,602 A * | 3/1982 | Richardson | 52/1 |
| 6,672,837 B1 | 1/2004 | Veldkamp et al. | |
| 6,713,891 B2 * | 3/2004 | Kirkegaard et al. | 290/44 |
| 2008/0145222 A1 | 6/2008 | Schellings | |
| 2010/0074749 A1 | 3/2010 | Garrido et al. | |
| 2010/0314883 A1 * | 12/2010 | Ollgaard | 290/55 |

FOREIGN PATENT DOCUMENTS

| | | | |
|---|---|---|---|
| EP | 1008747 A2 * | 6/2000 | |
| JP | 59097342 A * | 6/1984 | |
| JP | 02026390 A * | 1/1990 | |
| JP | 02282583 A * | 11/1990 | |
| JP | 4-129948 U | 11/1992 | |
| JP | 05156841 A * | 6/1993 | |
| JP | 11-159191 A | 6/1999 | |
| JP | 2002517660 A | 6/2002 | |

(Continued)

OTHER PUBLICATIONS

EP 1008747 A2 Machine Translation retrieved from ESPACEnet on Mar. 5, 2012.*
JP 05-156841 Machine Translation retrieved from PAJ on Mar. 5, 2012.*
ISR for PCT/JP2010/073514, mailed Mar. 15, 2011.

*Primary Examiner* — Igor Kershteyn
*Assistant Examiner* — Jesse Prager
(74) *Attorney, Agent, or Firm* — Kanesaka, Berner & Partners (57) ABSTRACT

A vibration control apparatus of a wind turbine generator that can be installed in a small space inside a tower, without a weight increase of the tower, and that can change the natural frequency thereof is provided. Included is a swinging rod extending in the vertical direction and suspended from beams provided on an upper part of the tower via a first universal joint; a flange part extending outward from the upper end outer surface of the swinging rod in the radial direction along the circumferential direction; a pendulum including a bob attached to the swinging rod and capable of moving up and down in the vertical direction; and a plurality of attenuation devices each of whose upper end is attached to the beams with a second universal joint and whose lower end is attached to the flange part with a third universal joint.

4 Claims, 8 Drawing Sheets

FOREIGN PATENT DOCUMENTS

| JP | 2006207502 A | 8/2006 |
| JP | 2008-031735 A | 2/2008 |
| JP | 2008151119 A | 7/2008 |
| JP | 2008190645 A | 8/2008 |

* cited by examiner

FIG. 11

VIBRATION CONTROL APPARATUS OF WIND TURBINE GENERATOR AND WIND TURBINE GENERATOR

CROSS REFERENCE TO RELATED APPLICATIONS

This is a continuation of International Application PCT/JP/2010/073514, with an international filing date of Dec. 27, 2010, which is hereby incorporated by reference herein in its entirety.

BACKGROUND OF THE INVENTION

1. Field of the Invention

The present invention relates to a vibration control apparatus that is suitable for application to a wind turbine generator.

2. Description of Related Art

Today, wind turbine generators are being made larger and larger in order to improve their power generating efficiency and to increase the amount of generated power, and ones having a hub height (height from ground to center of hub) exceeding 100 m have been designed for practical use.

However, with those that have a hub height exceeding 100 m, the first-mode natural frequency of the tower matches the resonance range associated with the rotation of the rotor head and the wind-turbine rotary blades, and thus, the fatigue load might significantly increase. Therefore, the thickness of the tower needs to be increased so as to reduce the fatigue load applied to the tower, and thus, there is a problem in that the weight of the tower significantly increases.

Accordingly, to avoid such problems, by using, for example, a vibration control apparatus disclosed in Japanese Unexamined Patent Application, Publication No. 2008-31735, the response can be reduced even when the first-mode natural frequency of a tower matches the resonance range associated with the rotation of the rotor head and wind-turbine rotary blades.

However, when the vibration control apparatus disclosed in Japanese Unexamined Patent Application, Publication No. 2008-31735 is applied to a wind turbine generator, one end of a damper (attenuation device) is secured to an inner wall surface of the tower. Therefore, the inner wall surface of the tower has to be reinforced, and thus, there is a problem in that the weight of the tower increases.

Furthermore, to apply a vibration control apparatus to a wind turbine generator, the structure should not interfere with the beauty of the environment, and it needs to be installed in a small space in the tower; therefore, the size of the vibration control apparatus needs to be minimized.

Furthermore, during assembly of the wind turbine generator, the natural frequency of the tower changes (becomes smaller) in each of the following stages: a stage in which only the tower is completed; a stage in which a nacelle is mounted at the upper end of the tower; and a stage in which a rotor head and wind-turbine rotary blades are attached to the nacelle, completing the entire wind turbine generator. Therefore, it is preferable that the natural frequency of the vibration control apparatus can be variable accordingly.

BRIEF SUMMARY OF THE INVENTION

The present invention has been conceived in light of such circumstances, and an object thereof is to provide a vibration control apparatus of a wind turbine generator that can be installed in a small space in a tower, without a weight increase of the tower, and that can change the natural frequency thereof.

To solve the problems described above, the present invention provides the following solutions.

A vibration control apparatus of a wind turbine generator stored and disposed inside a tower of the wind turbine generator includes a swinging rod extending in the vertical direction and suspended from a beam provided on an upper part of the tower via a first universal joint; a flange part extending outward in a horizontal direction from the upper end of the swinging rod; a pendulum attached to the swinging rod and including a bob capable of moving up and down in the vertical direction; and a plurality of attenuation devices each of whose upper end is attached to the beam with a second universal joint and whose lower end is attached to the flange part with a third universal joint.

The vibration control apparatus of a wind turbine generator according the present invention has an advantage in that the attenuation of the tower first-mode vibration is increased and an advantage in that the tower first-mode vibration and amplitude associated with the rotation of the wind-turbine rotary blades due to the increase in attenuation are prevented. In this way, a weight increase of the tower can be prevented, and a wind turbine generator having a hub height exceeding 100 m can be easily designed.

Furthermore, since a part of the vibration control apparatus (for example, the damper (attenuation device)) is not secured to the inner wall surface of the tower, the inner wall surface of the tower does not require reinforcement, and a weight increase of the tower can be prevented.

Moreover, by moving the bob up and down in the axial direction of the swinging rod, the natural frequency of the vibration control apparatus changes. That is, during assembly of the wind turbine generator, the natural frequency of the tower changes in each of the following stages: a stage in which only the tower is completed; a stage in which a nacelle is mounted at the upper end of the tower; and a stage in which a rotor head and wind-turbine rotary blades are attached to the nacelle, completing the entire wind turbine generator.

In this way, the wind turbine generator can be safely and quickly assembled.

In the above-described vibration control apparatus of a wind turbine generator, it is more preferable that at least two pendular TMDs (Tuned Mass Dampers) each including the pendulum and the attenuation device are included and that the adjoining bobs are connected to each other with a connecting device.

With such a vibration control apparatus of a wind turbine generator, even when some or all of the attenuation devices constituting one of the pendular TMD are damaged (become nonfunctioning), vibration is controlled by the other pendular TMD joined with the connecting device (the other pendular TMD 18 joined with the connecting device 41 functions as a fail-safe). In this way, the reliability of the vibration control apparatus can be improved.

In the above-described vibration control apparatus of a wind turbine generator, it is more preferable that the beam is a beam supporting a top floor provided at the uppermost part of the tower.

Since such a vibration control apparatus of a wind turbine generator is disposed in a position where a maximum attenuation effect is achieved, the size of the vibration control apparatus can be reduced even more.

In the above-described vibration control apparatus of a wind-turbine generator, it is more preferable that a maintenance floor be provided directly below the top floor and at a position where the attenuation device is accessible by an operator.

With such a vibration control apparatus of a wind turbine generator, the attenuation device can be easily and quickly maintained, and thus, the ease maintenance can be improved.

A wind turbine generator according to the present invention includes a vibration control apparatus of a wind turbine generator that can be installed in a small space inside a tower, without a weight increase of the tower, and that can change the natural frequency thereof.

With the wind turbine generator according to the present invention, it is possible to cope with an increase in size of the wind turbine generator, with a hub height exceeding 100 m.

The vibration control apparatus of the wind turbine generator according to the present invention is advantageous in that it can be installed in a small space inside a tower, without a weight increase of the tower, and that it can change the natural frequency thereof.

DETAILED DESCRIPTION OF THE INVENTION

A vibration control apparatus of a wind turbine generator according to an embodiment of the present invention will be described with reference to FIGS. 1 to 9.

Figure 1:
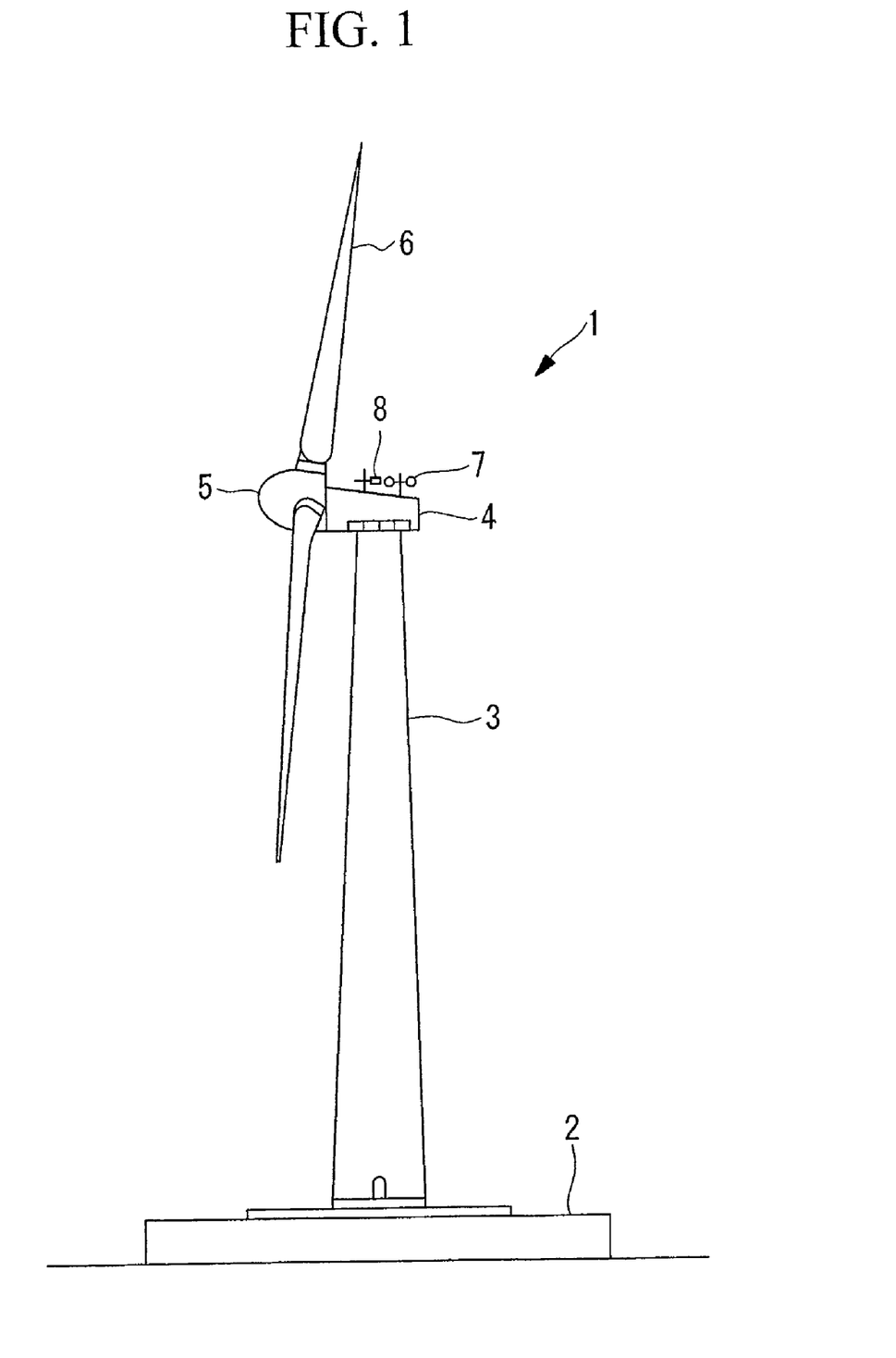
FIG. 1 is a schematic side view of a wind turbine generator including a vibration control apparatus of a wind turbine generator according to an embodiment of the present invention, as viewed from the left of a tower.
Figure 2:
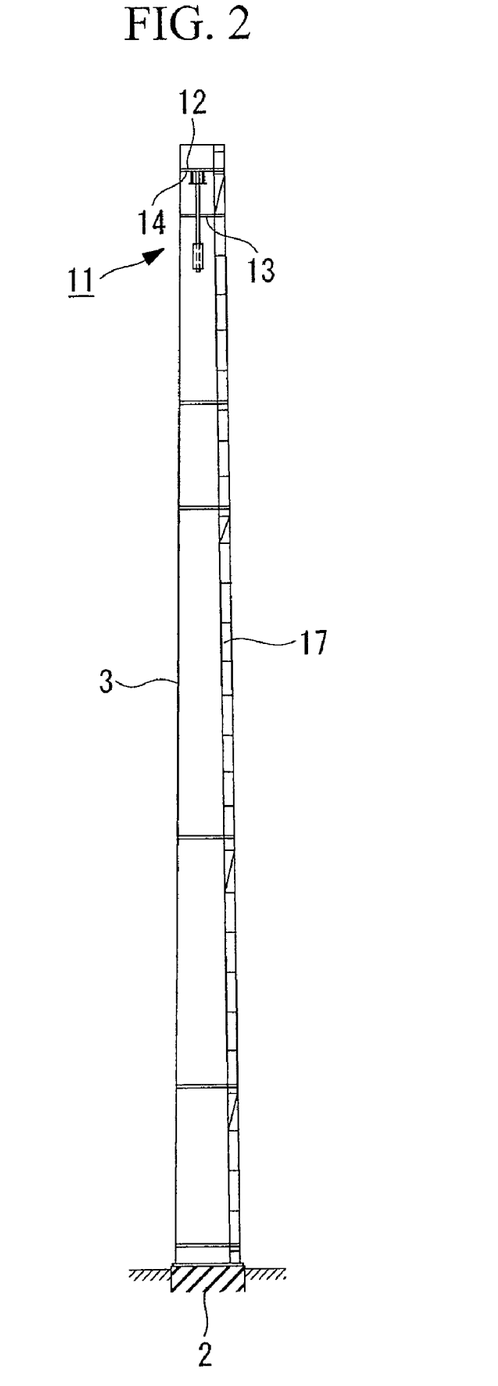
FIG. 2 is a side view of the inside of the tower of a wind turbine generator including a vibration control apparatus of a wind turbine generator according to an embodiment of the present invention, as viewed from the left of a tower.
Figure 3:
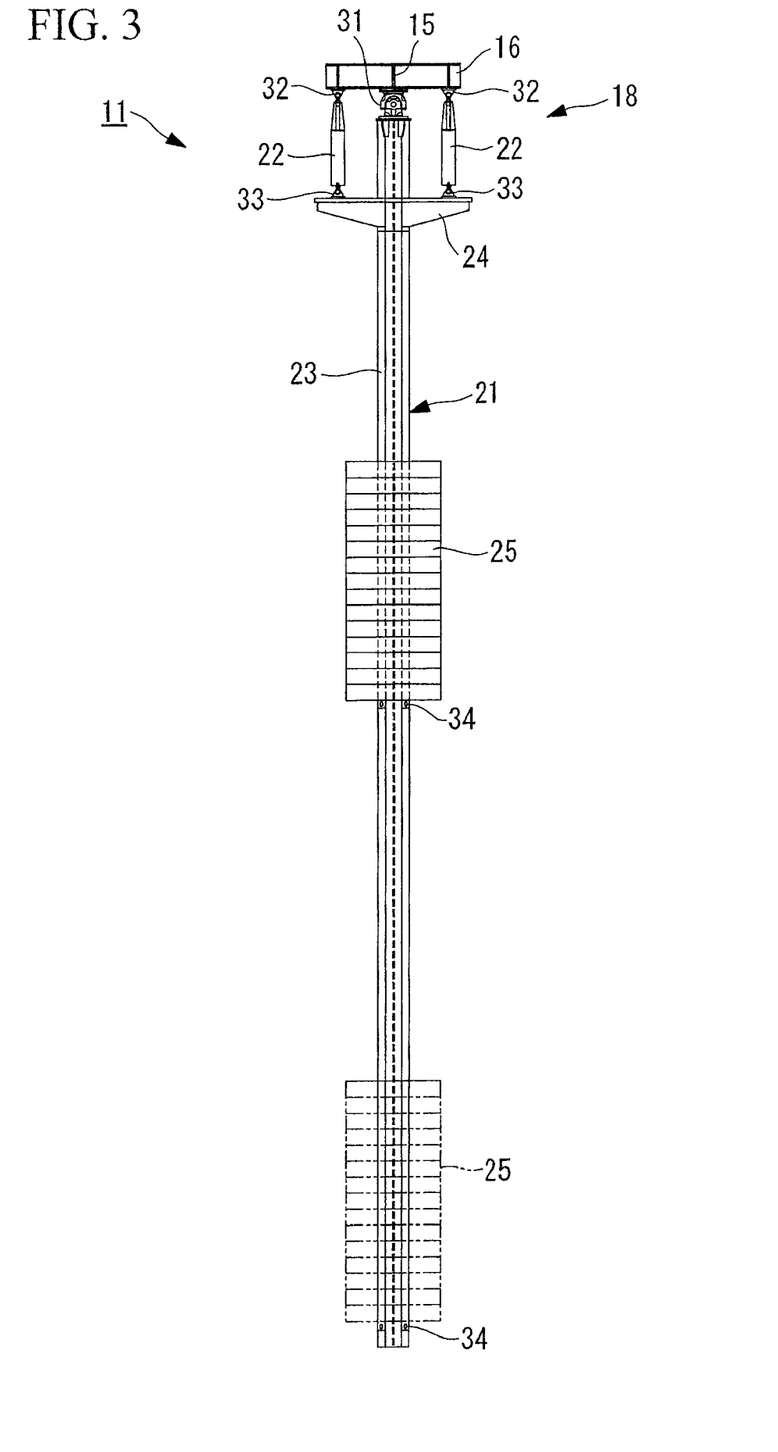
FIG. 3 illustrates the configuration of a vibration control apparatus of a wind turbine generator according to an embodiment of the present invention.
Figure 4:
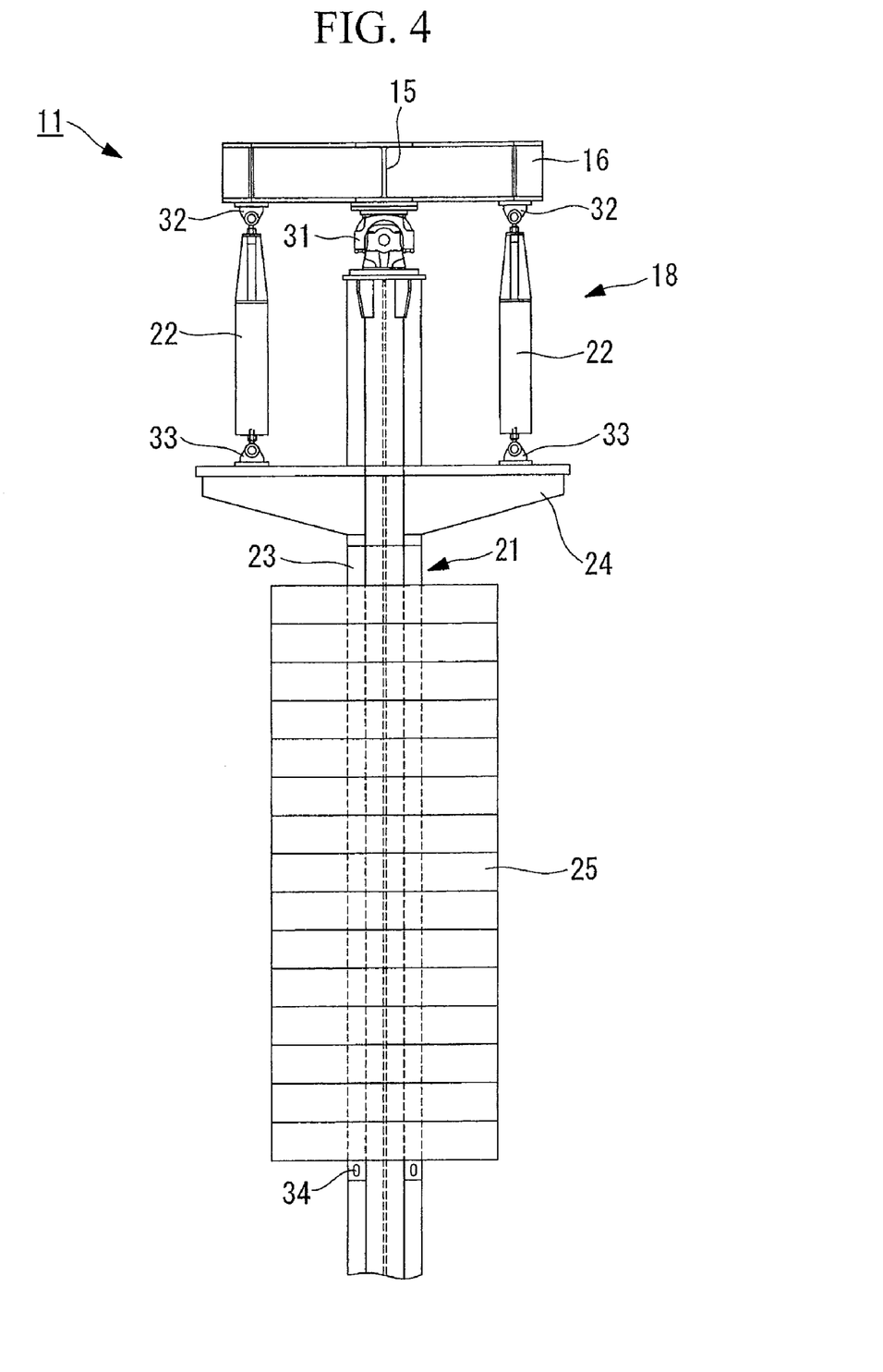
FIG. 4 is a diagram illustrating an enlarged relevant portion of FIG. 3.
Figure 5:
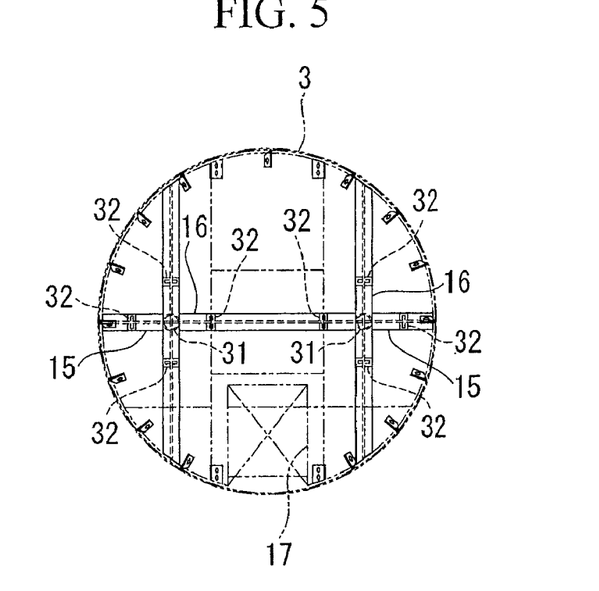
FIG. 5 illustrates the positional relationship of a longitudinal beam and a transverse beam disposed on the lower surface of a top floor and universal joints attached to these beams, as viewed from above the top floor viewed.
Figure 6:
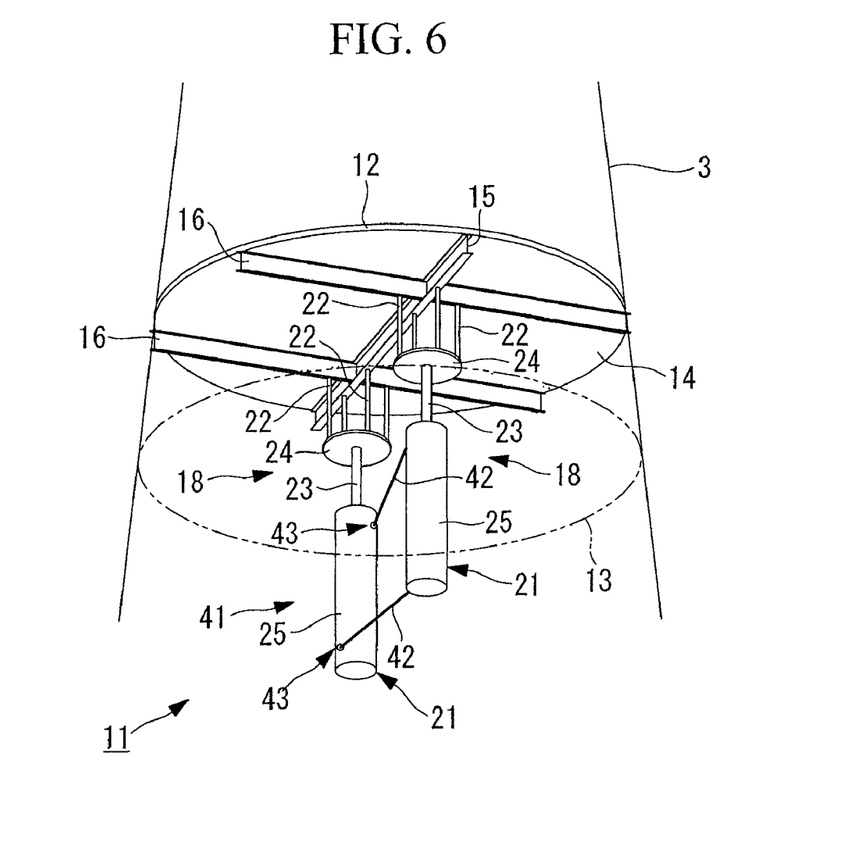
FIG. 6 is a perspective view schematically showing the overall configuration of the vibration control apparatus of a wind turbine generator according to an embodiment of the present invention.
Figure 7:
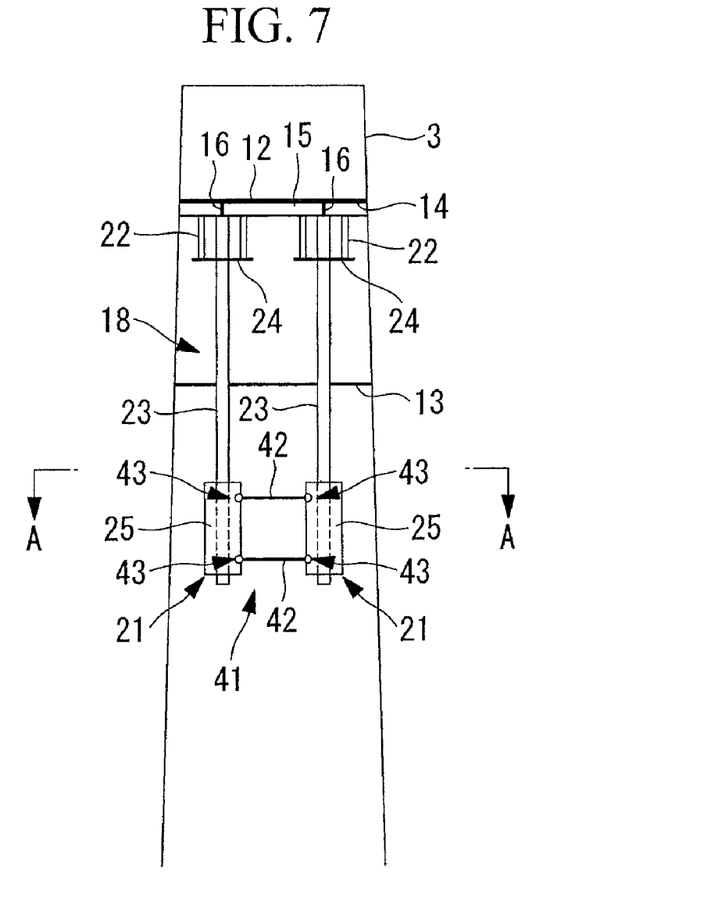
FIG. 7 is a perspective view schematically showing the overall configuration of the vibration control apparatus of a wind turbine generator according to an embodiment of the present invention, as viewed from the front of the tower.
Figure 8:
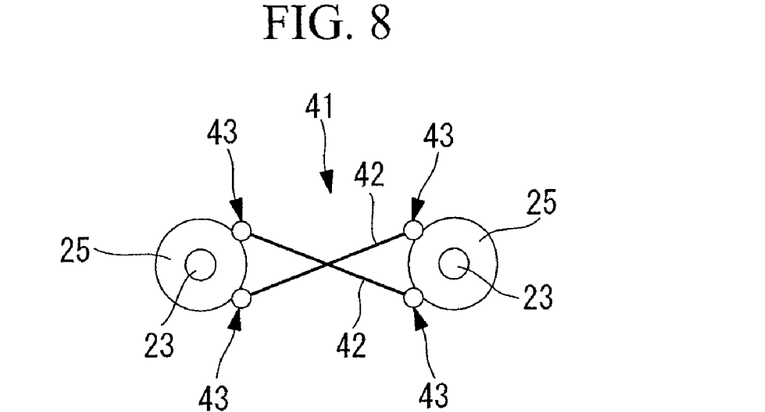
FIG. 8 is a sectional view taken along a line A-A in FIG. 7.
Figure 9:
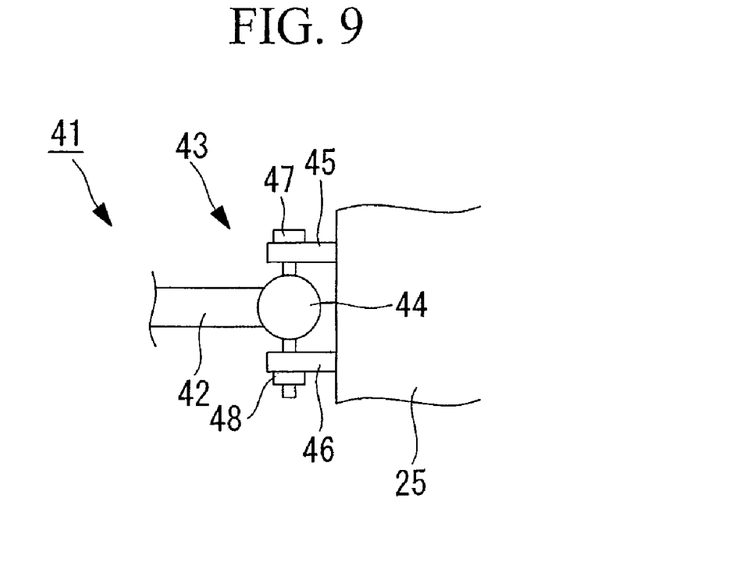
FIG. 9 is a diagram illustrating an enlarged relevant portion of a connecting device, as viewed from the front of the tower.

FIG. 1 is a schematic side view of a wind turbine generator including a vibration control apparatus of a wind turbine generator according to an embodiment of the present invention and, as viewed from the left of a tower; FIG. 2 is a side view of the inside of the tower of a wind turbine generator including a vibration control apparatus of a wind turbine generator according to an embodiment of the present invention, as viewed from the left of a tower; FIG. 3 illustrates the configuration of a vibration control apparatus of a wind turbine generator according to an embodiment of the present invention; FIG. 4 is a diagram illustrating an enlarged relevant portion of FIG. 3; FIG. 5 illustrates the positional relationship of a longitudinal beam and a transverse beam disposed on the lower surface of a top floor and universal joints attached to these beams, as the top floor viewed from the top; FIG. 6 is a perspective view schematically showing the overall configuration of the vibration control apparatus of a wind turbine generator according to an embodiment of the present invention; FIG. 7 is a schematic perspective view of the configuration, in outline, of the vibration control apparatus of a wind turbine generator according to an embodiment of the present invention, as the tower viewed from the front; FIG. 8 is a sectional view taken along a line A-A in FIG. 7; FIG. 9 is a diagram illustrating an enlarged relevant portion of a connecting device, as the tower viewed from the front.

As illustrated in FIG. 1, a wind turbine generator 1 includes a tower 3 vertically disposed on a foundation 2, a nacelle 4 mounted on the upper end of the tower 3, a rotor head 5 provided on the nacelle 4 in such a manner that it is rotatable around a substantially horizontal axis, and a plurality of (e.g., three) wind-turbine rotary blades 6 attached, in a radiating pattern, around the rotational axis of the rotor head 5. Then, the force of wind striking the wind-turbine rotary blades 6 from the rotational axis direction of the rotor head 5 is converted to motive energy causing the rotor head 5 to rotate around the rotational axis.

On the upper part of the nacelle 4, an anemometer 7 that measures the wind speed in the surroundings, an anemoscope 8 that measures the wind direction, and a lightning rod (not shown) are provided.

Although not illustrated, a generator connected to the rotor head 5 with a coaxial gearbox is installed inside the nacelle 4. That is, by speeding up the rotation of the rotor head 5 with the gearbox and driving the generator, a generator output is obtained from the generator.

As illustrated in FIG. 2, a wind turbine generator vibration control apparatus (hereinafter, referred to as "vibration control apparatus") 11 according to this embodiment is, for example, installed such that it is suspended from a transverse beam 15 and longitudinal beams 16 (see FIGS. 3 to 7) supporting a lower surface 14 of a top floor 12 provided on the uppermost part inside the tower 3. Here, the lower surface 14 of the top floor 12 is the ceiling of an elevator stopping floor (maintenance floor) 13 provided directly below the top floor 12.

Here, reference numeral 17 in FIG. 2 represents a portion referred to as "ladder" provided from the lowermost part to, the uppermost part of the tower 3 in the height direction (longitudinal direction) of the tower 3, and an elevator (not shown) moves up and down inside the ladder 17.

As illustrated in FIGS. 6 and 7, the vibration control apparatus 11 according to this embodiment includes a plurality of (two in this embodiment) pendular TMDs (tuned mass dampers) 18.

Each pendular TMD 18 includes a pendulum 21 and a plurality of (four in this embodiment) oil dampers (attenuation devices) 22.

As illustrated in at least one of FIGS. 3, 4, 6, and 7, the pendulum 21 includes a swinging rod 23, a flange part (flange part) 24, and a bob 25. The swinging rod 23 extends in the height direction of the tower 3 (see FIGS. 1 and 2). The flange part 24 extends outward on a plane that extends outward in the radial direction along the circumferential direction from the upper end outer surface (outer circumferential surface) of the swinging rod 23 and that is orthogonal to the axial direction (longitudinal direction) of the swinging rod 23, i.e., a horizontal plane. The bob 25 is attached to the swinging rod 23 and is configured in such a manner that it is movable up and down in the axial direction of the swinging rod 23, i.e., the vertical direction.

Here, the bob 25 indicated by a solid line in FIG. 3 represents a case in which the pendulum length (distance from the center of a universal joint 31 to the center of the bob 25 in the height direction (vertical direction in FIG. 3)) is 3 m.

Furthermore, the bob 25 indicated by a two-dot chain line (imaginary line) in FIG. 3 represents a case in which the pendulum length (distance from the center of the universal joint 31 to the center of the bob 25 in the height direction (vertical direction in FIG. 3)) is 7 m.

As illustrated in FIG. 5, the swinging rod 23 constituting one (left) pendular TMD 18 is suspended via the (first) universal joint (universal joint) 31. This universal joint 31 is orthogonal to the center axis of the tower 3 extending in the height direction of the tower 3 and is attached at the center part of a lower surface of the transverse beam 15 that extends in the transverse (left-to-right) direction (left-to-right direction in FIG. 5) of the tower 3 and is positioned in the left half (left half in FIG. 5) of the tower 3. Furthermore, as illustrated in FIG. 5, the swinging rod 23 constituting the other (right) pendular TMD 18 is suspended via the universal joint 31. This universal joint 31 is orthogonal to the center axis of the tower 3 extending in the height direction of the tower 3 and is attached at the center part of a lower surface of the transverse beam 15 that extends in the transverse direction of the tower 3 and is positioned in the right half (right half in FIG. 5) of the tower 3.

At the center part of the transverse beam 15 positioned in the left half of the tower 3, a longitudinal beam 16 is connected (joined) with the transverse beam 15 such that they are continuous and orthogonal to each other on a plane containing the transverse beam 15. Furthermore, at the center part of the transverse beam 15 positioned in the right half of the tower 3, a longitudinal beam 16 is connected (joined) with the transverse beam 15 such that they are continuous and orthogonal to each other on a plane containing the transverse beam 15.

Moreover, (second) universal joints (universal joints) 32 to which the upper ends of the oil dampers 22 are attached are respectively attached to the lower surface of the transverse beam 15 at equal distances in the left-to-right directions from the center of the transverse beam 15 positioned in the left half of the tower 3. Universal joints 32 to which the upper ends of the oil dampers 22 are attached are respectively attached to the lower surface of the longitudinal beam 16 at equal distances in the longitudinal (front-to-back) directions (vertical direction in FIG. 5) from the center of the transverse beam 15 positioned in the left half of the tower 3. Universal joints 32 to which the upper ends of the oil dampers 22 are attached are respectively attached to the lower surface of the transverse beam 15 at equal distances in the left-to-right directions from the center of the transverse beam 15 positioned in the right half of the tower 3. Universal joints 32 to which the upper ends of the oil dampers 22 are attached are respectively attached to the lower surface of the longitudinal beam 16 at equal distances in the longitudinal directions from the center of the transverse beam 15 positioned in the right half of the tower 3.

As illustrated in FIGS. 3, 4, 6, and 7, the flange part 24 is a (substantially) disk-like member having a circular shape in plan view.

(Third) universal joints 33 (see FIGS. 3 and 4) to which the lower ends of the oil dampers 22 are attached are respectively attached to the upper surface of the flange part 24 (opposing the universal joints 33) positioned directly below the universal joints 33.

As illustrated in FIGS. 3 and 4, the bob 25 is constituted of, for example, a plurality of (15 in this embodiment) ring-shaped (donut-shaped) weights having the same inner diameter, outer diameter, and weight stacked in the axial direction of the swinging rod 23, and, in this embodiment, the total weight of the bob 25 is set to 3.3 tons.

Furthermore, in this embodiment, when the pendulum length (distance from the center of the universal joint 31 to the center of the bob 25 in the height direction (vertical direction in FIG. 3)) is 3 m, the natural frequency of the vibration control apparatus 11 is 0.3 Hz, and the amplitude (stroke) of the tip (lower end) of the swinging rod 23 is ±300 mm. Furthermore, when the pendulum length is 7 m, the natural frequency of the vibration control apparatus 11 is set to 0.2 Hz, and the amplitude (stroke) of the tip (lower end) of the swinging rod 23 is set to ±200 mm.

Here, reference numeral 34 in FIGS. 3 and 4 represents a positioning (anti-drop) mechanism (for example, pin) that positions the bob 25 and prevents the bob 25 from dropping.

As illustrated in FIGS. 6, 7, and 8, the bob 25 constituting one of the pendular TMDs 18 and the bob 25 constituting the other pendular TMD 18 are connected with a connecting device 41.

The connecting device 41 includes a plurality of (two in this embodiment) connecting rods (flat bars) 42 and a plurality of (four in this embodiment) connecting members 43 (see FIG. 9) that connects the ends of the connecting rods 42 and the outer surface (outer circumferential surface) of the bob 25.

The connecting rods 42 are disposed such that they intersect with each other at a predetermined angle (for example, 60 degrees) when the vibration control apparatus 11 is viewed from below (or above), as illustrated in FIGS. 6 and 8, and they are parallel to each other when the vibration control apparatus 11 is viewed from the front (or back), as illustrated in FIG. 7. Furthermore, spherical (sliding) bearings 44 are connected (attached) to the ends of the connecting rods 42.

As illustrated in FIG. 9, each connecting member 43 includes two vertically arranged (a pair of) eye plates 45 and 46, a bolt (pin) 47, and a nut 48. The eye plates 45 and 46 protrude from the outer surface of the bob 25 such that they clamp the ends of the corresponding connecting rods 42 from the top and bottom. The bolt (pin) 47 is inserted into a through-hole (not shown) formed in the eye plates 45 and 46 and a through-hole (not shown) formed in an inner ring (not shown) of the spherical (sliding) bearing 44. The nut 48 is screwed to the tip (lower end) of the bolt 47.

The vibration control apparatus 11 of this embodiment has an advantage in that attenuation of the tower first-mode vibration is increased and has an advantage in that, due to the increase in attenuation, the tower first-mode vibration and amplitude associated with the rotation of the wind-turbine rotary blades are suppressed. In this way, a weight increase of the tower 3 can be prevented, and a wind turbine generator 1 having a hub height exceeding 100 m can be easily designed.

Furthermore, since a part (for example, the damper (attenuation device)) of the vibration control apparatus 11 is not secured to the inner wall surface of the tower 3, the inner wall surface of the tower 3 does not require reinforcement, and a weight increase of the tower 3 can be prevented.

Moreover, the natural frequency of the vibration control apparatus 11 changes by moving the bob 25 up and down in the axial direction of the swinging rod 23. That is, during assembly of the wind turbine generator 1, the natural frequency of the tower 3 changes in response to each of the following stages: a stage in which only the tower 3 is completed; a stage in which the nacelle 4 is mounted at the upper end of the tower 3; and a stage in which the rotor head 5 and the wind-turbine rotary blades 6 are attached to the nacelle 4, completing the entire wind turbine generator 1. In this way, the wind turbine generator 1 can be safely and quickly assembled.

Moreover, even when some or all of the oil dampers 22 constituting one of the pendular TMDs 18 are damaged (become nonfunctioning), vibration is controlled by the other pendular TMD 18 joined with the connecting device 41 (the other pendular TMD 18 joined with the connecting device 41 functions as a fail-safe). In this way, the reliability of the vibration control apparatus 11 can be improved.

Moreover, since the vibration control apparatus 11 of this embodiment is suspended from the top floor 12, which provides the best attenuation effect, the size of the vibration control apparatus 11 can be reduced even more.

Moreover, the elevator stopping floor (maintenance floor) 13 is provided directly below the top floor 12 and at a position where an operator can reach, while standing, and maintain the oil dampers 22, i.e., a position where the oil dampers 22 are accessible. In this way, the oil dampers 22 can be easily and quickly maintained, and the ease of maintenance can be improved.

Meanwhile, the wind turbine generator 1 of this embodiment can be installed in a small space in the tower 3, without a weight increase of the tower 3, and includes the vibration control apparatus 11 that can change the natural frequency thereof. In this way, it is possible to cope with an increase in size of the wind turbine generator, with a hub height exceeding 100 m.

The present invention is not limited to the embodiment described above, and appropriate modifications and changes may be employed when necessary.

Figure 10:
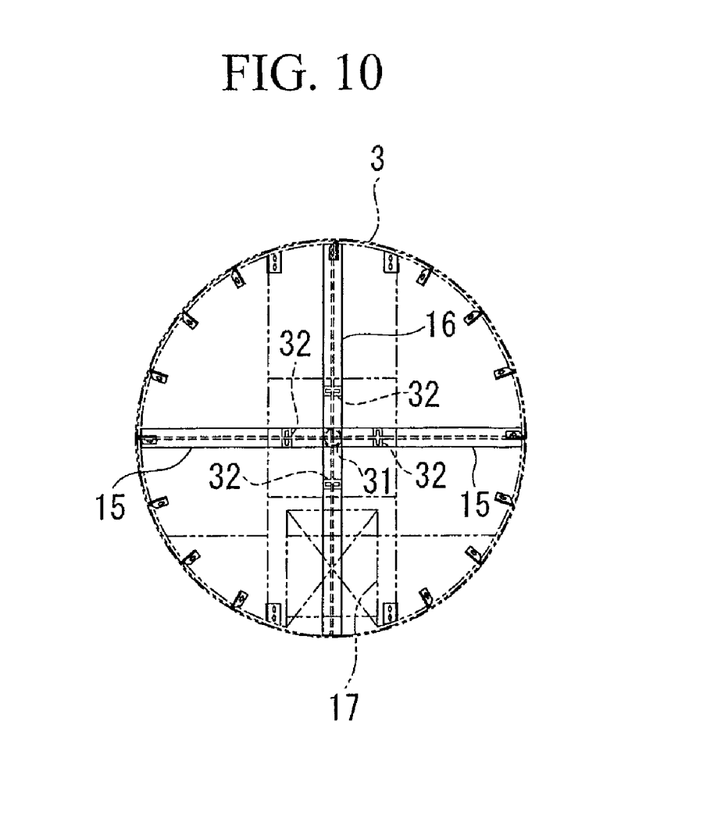
FIG. 10 illustrates the positional relationship of a longitudinal beam and a transverse beam disposed on the lower surface of a top floor according to another embodiment and universal joints attached to these beams, as viewed from above the top floor.

For example, in the embodiment described above, the vibration control apparatus 11 having two pendular TMDs 18 is described as a specific example; the present invention, however, is not limited thereto. For example, as illustrated in FIG. 10, the configuration can be such that one pendular TMD 18 is suspended via one universal joint 31. In such a case, the universal joint 31 is attached to the center part of a longitudinal beam 16 and the center part of the lower surface of a transverse beam 15. The longitudinal beam 16 is a beam that is orthogonal to the center axis of the tower 3 extending in the height direction of the tower 3 and extends in the longitudinal (front-to-back) direction (vertical direction in FIG. 10) of the tower 3. The transverse beam 15 is a beam that is orthogonal to the center axis of the tower 3 extending in the height direction of the tower 3 and extends in the transverse (left-to-right) direction (left-to-right direction in FIG. 10) of the tower 3.

Figure 11:
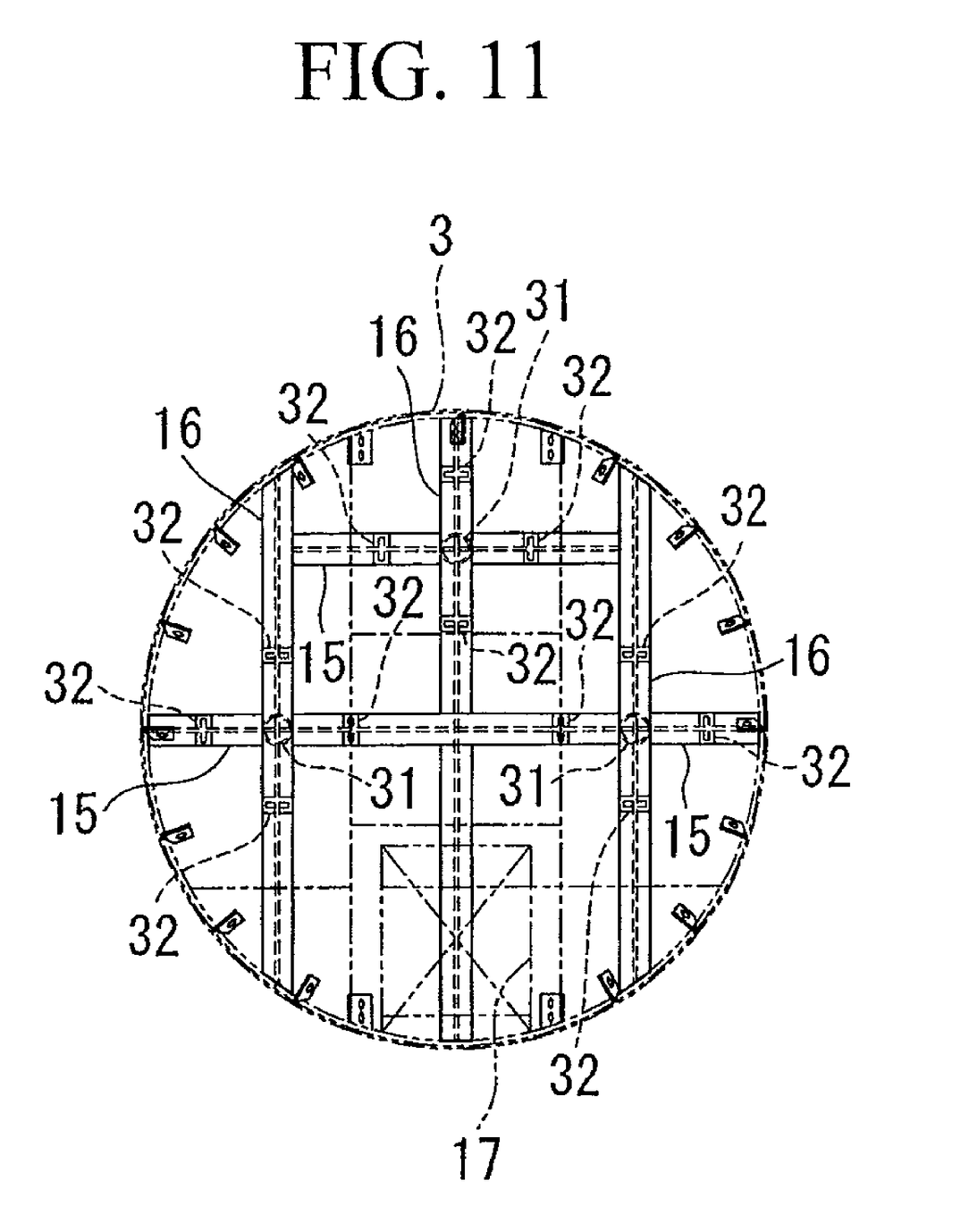
FIG. 11 illustrates the positional relationship of a longitudinal beam and a transverse beam disposed on the lower surface of a top floor according to another embodiment and universal joints attached to these beams, as viewed from above the top floor.

Furthermore, as illustrated in FIG. 11, the configuration can be such that one pendular TMD 18 is suspended via three universal joints 31. In this case, the first universal joint 31 is attached to the front half of a longitudinal beam 16 and the center part of the lower surface of a transverse beam 15 orthogonal to the front half of the longitudinal beam 16. The second universal joint 31 is attached to the right half of a transverse beam 15 and the center part of the lower surface of a longitudinal beam 16 orthogonal to the center part of the transverse beam 15. The third universal joint 31 is attached to the left half of the transverse beam 15 and the center part of the lower surface of a longitudinal beam 16 orthogonal to the center part of the transverse beam 15.

What is claimed is:

1. A vibration control apparatus for a wind turbine generator accommodated and disposed inside a tower of the wind turbine generator, the apparatus comprising:
    a swinging rod extending in a vertical direction and configured to be suspended from a beam provided on an upper part of the tower via a first universal joint;
    a flange part extending outward in a horizontal direction from an upper end of the swinging rod;
    a pendulum including bobs attached to the swinging rod and said bobs being capable of moving up and down in the vertical direction;
    a plurality of attenuation devices each of whose upper end is attached to the beam with a second universal joint and whose lower end is attached to the flange part with a third universal joint; and
    at least two pendulaly tuned mass dampers each including the pendulum and the plurality of attenuation devices,
    wherein
    the adjoining bobs are connected to each other with a connecting device including a plurality of connecting rods,
    the connecting rods intersect with each other when the vibration control apparatus is viewed from the vertical direction, and
    the connecting rods are parallel to each other when the vibration control apparatus is viewed from the horizontal direction.

2. The vibration control apparatus according to claim 1, wherein the beam is a beam supporting a top floor provided at the uppermost part of the tower.

3. The vibration control apparatus according to claim 2, wherein a maintenance floor is provided directly below the top floor and at a position where the attenuation device is accessible by an operator.

4. A wind turbine generator comprising the vibration control apparatus according to claim 1.

* * * * *